US010708248B2

(12) United States Patent
Kim et al.

(10) Patent No.: US 10,708,248 B2
(45) Date of Patent: Jul. 7, 2020

(54) VEHICLE AND METHOD FOR CONTROLLING SAME

(71) Applicant: LG Electronics Inc., Seoul (KR)

(72) Inventors: Cheolseung Kim, Seoul (KR); Seongsoo Kim, Seoul (KR); Byeongrim Jo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/266,911

(22) Filed: Feb. 4, 2019

(65) Prior Publication Data

US 2019/0173862 A1 Jun. 6, 2019

Related U.S. Application Data

(63) Continuation of application No. PCT/KR2016/008556, filed on Aug. 3, 2016.

(51) Int. Cl.
| | | |
|---|---|---|
| *H04L 29/06* | (2006.01) | |
| *H04L 12/40* | (2006.01) | |
| *H04L 9/08* | (2006.01) | |
| *H04L 9/32* | (2006.01) | |
| *B60R 16/023* | (2006.01) | |

(52) U.S. Cl.
CPC ............ *H04L 63/062* (2013.01); *H04L 9/083* (2013.01); *H04L 9/088* (2013.01); *H04L 9/0891* (2013.01); *H04L 9/3242* (2013.01); *H04L 12/40* (2013.01); *H04L 63/065* (2013.01); *B60R 16/023* (2013.01); *H04L 2012/40215* (2013.01); *H04L 2012/40273* (2013.01); *H04L 2209/84* (2013.01)

(58) Field of Classification Search
CPC ..... H04L 63/062; H04L 63/065; H04L 12/40; H04L 2012/40215; H04L 2012/40273; H04L 9/08; B60R 16/023
See application file for complete search history.

(56) References Cited

U.S. PATENT DOCUMENTS

| | | | | |
|---|---|---|---|---|
| 7,602,915 | B2 * | 10/2009 | Iwamura | H04L 9/0822 380/259 |
| 9,716,595 | B1 * | 7/2017 | Kravitz | H04L 9/3268 |
| 10,009,325 | B1 * | 6/2018 | David | H04L 12/40 |
| 10,218,499 | B1 * | 2/2019 | El Idrissi | G06F 21/73 |
| 10,279,775 | B2 * | 5/2019 | Shah | H04L 67/12 |

(Continued)

FOREIGN PATENT DOCUMENTS

| | | |
|---|---|---|
| JP | 2005-341528 A | 12/2005 |
| JP | 2008-113211 A | 5/2008 |

(Continued)

*Primary Examiner* — Hosuk Song
(74) *Attorney, Agent, or Firm* — Fish & Richardson P.C.

(57) ABSTRACT

A method of controlling a vehicle that includes a plurality of electronic control units (ECUs), the method including: allocating an order in which at least one ECU among the plurality of ECUs is to be assigned an encryption key, based on a data rate of each ECU; receiving, by the at least one ECU, at least one encryption key that is assigned to the at least one ECU according to the allocated order; and performing, by the at least one ECU and using the assigned at least one encryption key, (i) encryption of data to be transmitted through a Controller Area Network (CAN) communication bus, or (ii) decryption of data that is transmitted through the CAN communication bus.

19 Claims, 6 Drawing Sheets

(56) References Cited

U.S. PATENT DOCUMENTS

2011/0047630 A1    2/2011   Cheng et al.
2014/0040992 A1    2/2014   Koide et al.
2015/0172298 A1    6/2015   Otsuka

FOREIGN PATENT DOCUMENTS

JP         2014-241464 A    12/2014
KR        10-1003303 B1    12/2010
KR   10-2015-0109202 A    10/2015

\* cited by examiner $R_i(t) = r_{i,1}(t) + r_{i,2}(t) + r_{i,3}(t)$

VEHICLE AND METHOD FOR CONTROLLING SAME

CROSS-REFERENCE TO RELATED APPLICATIONS

This application claims the benefit of an earlier filing date and right of priority under 35 U.S.C. § 120 as a continuation application of International Application No. PCT/KR2016/008556, filed on Aug. 3, 2016, the contents of which are hereby expressly incorporated by reference into the present disclosure.

TECHNICAL FIELD

The present disclosure generally relates to vehicular security.

BACKGROUND

Generally, various electronic control units (ECUs) are included in a vehicle. For example, an engine management system (EMS), a transmission control unit (TCU), a body control unit (BCM), an electronic parking brake (EPB), and an electronic stability program (ESP), and the like are provided in the vehicle.

In some scenarios, more than a thousand ECUs are provided in a vehicle, and functions such as autonomous driving and emergency braking are realized by those ECUs provided in the vehicle.

SUMMARY

In one aspect, a method of controlling a vehicle that includes a plurality of electronic control units (ECUs) is disclosed. The method includes: allocating an order in which at least one ECU among the plurality of ECUs is to be assigned an encryption key, based on a data rate of each ECU; receiving, by the at least one ECU, at least one encryption key that is assigned to the at least one ECU according to the allocated order; and performing, by the at least one ECU and using the assigned at least one encryption key, (i) encryption of data to be transmitted through a Controller Area Network (CAN) communication bus, or (ii) decryption of data that is transmitted through the CAN communication bus.

In some implementations, the method may further include: classifying the plurality of ECUs into a plurality of groups; and selecting a master ECU for each group, wherein, for a group among the plurality of groups, the group includes one master ECU and one or more slave ECUs, and wherein the master ECU included in the group is configured to assign the encryption key.

In some implementations, at a first instance of time, the master ECU in the group is a first ECU in the group, and at a second instance of time, the master ECU in the group is a second ECU in the group, different from the first ECU.

In some implementations, the master ECU of the group has a lowest data rate among all ECUs included in the group.

In some implementations, the master ECU of the group sequentially assigns the encryption key to each of the one or more slave ECUs in the group, according to the allocated order.

In some implementations, the method further includes: a selection operation of selecting an i-th group among N groups, based on a corresponding sum of data rates of ECUs included in each of the N groups; and an assignment operation of assigning the at least one encryption key to a j-th ECU in the selected i-th group, based on a data rate of each of M ECUs in the selected i-th group, wherein at least one of the selection operation or the assignment operation is repeated until all ECUs are assigned a corresponding encryption key, and wherein N, M, i, and j are natural numbers, with $0 < i \leq N$, and $0 < j \leq M$.

In some implementations, the master ECU of the i-th group performs, in assigning the encryption key to the j-th ECU of the i-th group: inserting, into a data field of a CAN frame, an encryption key to be assigned to the j-th ECU; encrypting the CAN frame using an existing encryption key set that is assigned to the j-th ECU; and transmitting, through the CAN communication bus, the encrypted CAN frame to the j-th ECU as a destination.

In some implementations, the master ECU of the i-th group, in encrypting the CAN frame, selects at least one field among fields constituting the CAN frame based on the j-th ECU, and performs encryption only for the selected at least one field, and the at least one field that is encrypted in the CAN frame depends on a type of the j-th ECU.

In some implementations, the master ECU of the i-th group includes a memory configured to store an encryption key set, the master ECU of the i-th group further performs generating the encryption key using the encryption key set, in assigning the encryption key to the j-th ECU, and the generated encryption key is inserted into the data field of the CAN frame.

In some implementations, the memory is disposed in a circuit board provided in the master ECU of the i-th group, and is disposed in a physically separated region that is inaccessible by unauthorized software on the circuit board.

In some implementations, the master ECU of the group performs: determining whether hacking has occurred based on at least one message that is transmitted through the CAN communication bus from the one or more slave ECUs in the group; and based on a determination that the hacking has occurred, requesting an encryption key change for assigning new encryption keys.

In some implementations, determining whether hacking has occurred includes: counting a number of messages that are transmitted over a period of time through the CAN communication bus by the one or more slave ECUs; and determining that the hacking has occurred based on a total number of messages that are transmitted over the period of time exceeding a threshold number that is set for the one or more slave ECUs.

In some implementations, all ECUs in the group share a same group ID, and the master ECU of the group assigns a same encryption key to the one or more slave ECUs having the same group ID.

In some implementations, the master ECU of the group assigns different encryption keys to the one or more slave ECUs in the group.

In some implementations, the method further includes: based on a second condition being satisfied, reclassifying the plurality of ECUs into new groups based on a data rate of each of the plurality of ECUs.

In another aspect, a vehicle including a plurality of electronic control units (ECUs) is disclosed. The vehicle includes: a plurality of slave ECUs each configured to, using an encryption key assigned thereto, (i) encrypt data to be transmitted through a CAN communication bus, or (ii) decrypt data that is transmitted through the CAN communication bus; a master ECU configured to: allocate an order in which at least one slave ECU among the plurality of slave ECUs is to be assigned an encryption key, based on a data rate of each of the at least one slave ECU; and sequentially assign at least one encryption key to the at least one slave ECU according to the allocated order. The vehicle further includes a master-of-master-ECUs configured to transmit an encryption key assignment command to the master ECU for the master ECU to assign encryption keys to the plurality of slave ECUs, based on a predetermined condition being satisfied.

In some implementations, the plurality of ECUs is grouped into a plurality of groups, the master ECU is one of a plurality of master ECUs that are respectively selected for the plurality of groups, a group among the plurality of groups includes the master ECU and at least one slave ECU, and the master ECU in the group is configured to assign the encryption key.

In some implementations, the master ECU of the group is an ECU having a lowest data rate, from among all ECUs included in the group, at a first instance of time, the master ECU in the group is a first ECU in the group, and at a second instance of time, the master ECU in the group is a second ECU in the group, different from the first ECU.

In some implementations, the master ECU of the group is further configured to: determine whether hacking has occurred for the at least one slave ECU in the group, and based on a determination that the hacking has occurred, transmit an encryption key change request to the master-of-master-ECU for assigning new encryption keys to the at least one slave ECU.

In some implementations, the master-of-master-ECU is further configured to: reclassify the plurality of ECUs into new groups based on a data rate of each of the plurality of ECUs, based on a second condition being satisfied.

Other implementations of this and other aspects include corresponding systems, apparatuses, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

All or part of the features described throughout this disclosure can be implemented as a computer program product including instructions that are stored on one or more non-transitory machine-readable storage media, and that are executable on one or more processing devices. All or part of the features described throughout this disclosure can be implemented as an apparatus, method, or electronic system that can include one or more processing devices and memory to store executable instructions to implement the stated functions.

The details of one or more implementations of the subject matter of this disclosure are set forth in the accompanying drawings and the description below. Other features, aspects, and advantages of the subject matter will become apparent from the description, the drawings, and the claims.

DETAILED DESCRIPTION

Figure 1:
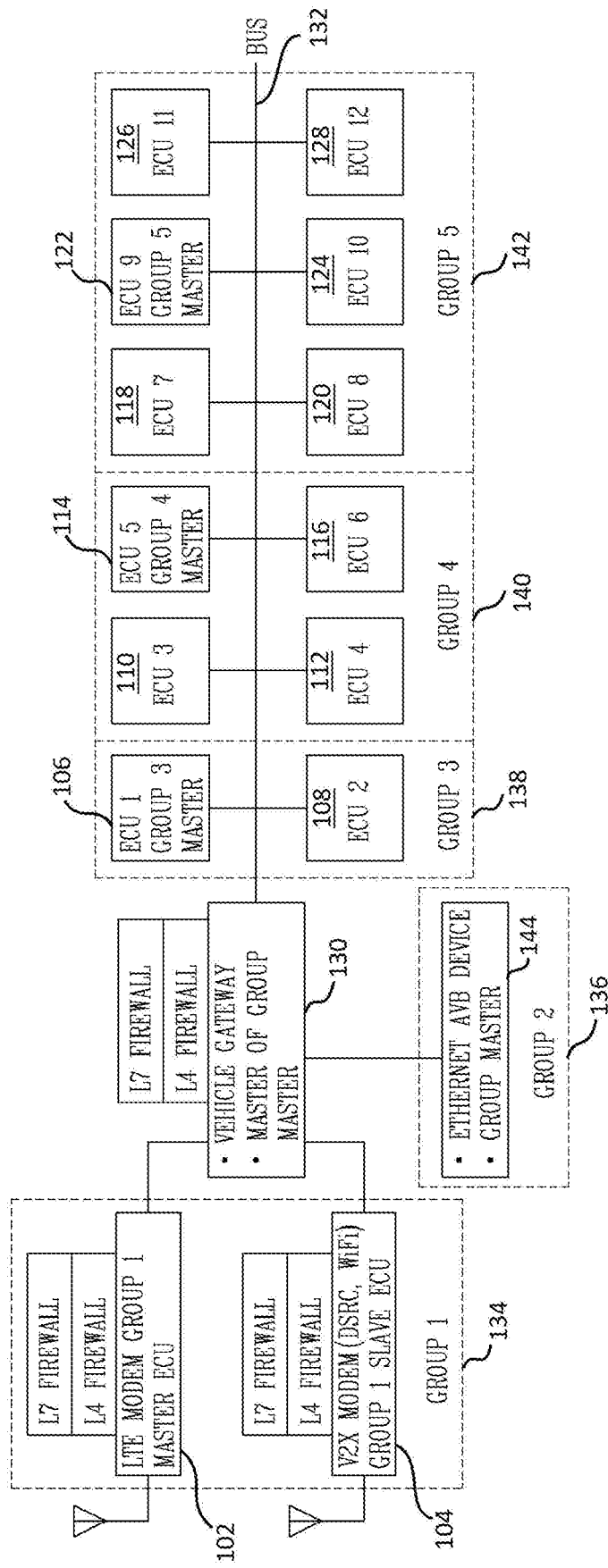
FIG. 1 is a diagram illustrating an example of a vehicle network in accordance with the present disclosure.

A vehicle control device described herein may be an apparatus or device for electronically controlling at least one component provided in a vehicle. For example, in some implementations, the vehicle control device may be an electronic control unit (ECU).

Vehicle control devices presented herein may be implemented in various types of devices. For example, vehicle control devices may be implemented in mobile terminals, such as cellular phones, smart phones, laptop computers, digital broadcast terminals, personal digital assistants (PDAs), portable multimedia players (PMPs), navigators, slate PCs, tablet PCs, ultra books, and wearable devices, and also may be stationary terminals such as digital TVs, desktop computers, digital signage, and the like.

In some implementations, for convenience and safety of a user who uses a vehicle, various types of ECUs may be provided in a vehicle, performing various types of functions.

In some scenarios, a vehicle network may be provided in a vehicle so that a plurality of ECUs in the vehicle may communicate. One example of such a vehicle network is a Control Access Network (CAN), and communications among the ECUs may be performed through a shared communication bus of the CAN. However, a CAN may have weaknesses, such as lacking a protocol that provides sufficient security-related standard or a security function. In such scenarios, a third party may infiltrate the CAN by hacking to manipulate or cause malfunction of ECUs provided in a vehicle.

As various operations of a vehicle are implemented by communications among ECUs, there may arise a problem of malfunction of the vehicle due to malicious attacks, such as hacking.

For example, a hacker may attack one or more ECUs provided in a vehicle by maliciously accessing a CAN of the vehicle. In some scenarios, the hacker may access the CAN via an external modem, install a hacking program through a wireless gateway in the vehicle, or cause a large increase in the amount of traffic that the CAN cannot manage. In some scenarios, hackers may attack the CAN through techniques such as Read, Spoof, Drop, Modify, Flood, Steal, and Replay.

In order to protect the vehicle network, such as a CAN, from such hacking, some systems may attempt to implement a "white box" firewall, through which packets having allowed or authenticated Internet Protocol (IP) addresses and protocols (e.g., Transmission Control Protocol (TCP), User Datagram Protocol (UDP), etc.) are passed. Additionally or alternatively, some systems may attempt to implement a "black box" firewall that blocks packets being transmitted from IPs or protocols that are registered in a "blacklist." Additionally or alternatively, some systems may attempt to implement a firewall (e.g., a Layer 7 Firewall) on the CAN that checks whether malicious code is included in an application when the application is downloaded from a trusted server.

However, the foregoing solution attempts may have drawbacks and/or deficiencies. For example, in scenarios where a large number and/or a wide variety of different terminals are configured to perform communications with a vehicle (e.g., an Internet of Things (IoT) scenario), the foregoing firewall techniques may face challenges.

For example, the white box type of firewall may be limited because of the large amount of storage space that is implemented to keep track of the authenticated IP addresses and authenticated protocols that are registered in a whitelist to pass through the firewall. As more and more devices are allowed to access, the whitelist of allowed or authenticated entities becomes longer, utilizes a larger amount of memory space, and takes an increasing amount of time to determine whether sent packets have been authenticated to access.

As another example, the black box type of firewall may be limited because the vehicle may be attacked through an IP which has not been registered in the blacklist. Maintaining an accurate and up-to-date blacklist may therefore be a challenge, for example in scenarios where various types of devices and protocols are being implemented in a vehicle network.

Implementations of the present disclosure may address such challenges by implementing a vehicle control method configured to protect a vehicle even in scenarios where a packet of a hacker passes through a firewall.

A vehicle control method according to some implementations of the present disclosure applies a public key encryption algorithm to a CAN. For example, an ECU that transmits and receives messages through a bus of a CAN may protect itself from hacking by encrypting or decrypting messages transmitted and received according to the public key encryption algorithm.

The public key encryption algorithm according to some implementations may be different from other public encryption system in which a sender and a receiver share the same secret key (or encryption key). According to some implementations of the present disclosure, an encryption key and a decryption key may be different from each other in the public key encryption algorithm, and therefore communication secrecy may be secured using the decryption key that is possessed by an individual even if the counterpart encryption key is opened. The public key encryption algorithm according to some implementations may provide an effective alternative that provides a variety of information protection functions such as authentication, non-repudiation and digital signature as well as confidentiality and integrity functions provided by a symmetric key cryptography, and solving a key distribution problem. In order to commercialize the public key encryption, a Public Key Infrastructure (PKI) may be implemented as a system for generation, distribution, and secure management of keys.

Public Key Infrastructure (PKI) refers to a complex security system environment for providing encryption and a digital signature through a public key algorithm. The PKI system may encrypt transmission/reception data using a public key provided with an encryption key and a decryption key and authenticate a user through a digital certificate.

In general, techniques of encrypting data may be categorized into a public key (asymmetric key) algorithm and a secret key (symmetric key) algorithm. A secret key encryption system shares the same secret key on both a sender and a receiver, whereas a public key encryption system has different encryption and decryption keys.

Therefore, the public key algorithm may have different keys for encrypting data and decrypting the data, so as to provide improved data security and less possibility of information leakage.

In order to commercialize the public key encryption, a PKI encryption system may generate and authenticate keys, and distribute and securely manage such keys.

In some scenarios, this PKI may include a "certification authority" that issues a certificate for a public key, a "registration authority" that verifies user's identity and affiliation in place of a certification authority when the user applies for a certificate, a "directory" that provides storage and retrieval of a certificate, user-related information, a cross-certificate pair and a certificate revocation list, and a user who generates and verifies an electronic signature using a public key in various applications and performs encryption and decryption of data. In some implementations of the present disclosure, the user may correspond to an ECU.

The public key infrastructure (PKI) may basically perform secure certificate management and provide functions such as issuing, storing, and revoking of certificates, establishing authentication policies, and the like. In addition, the PKI may support data storage and naming and registration functions of users and certification authorities.

In some implementations, a certification authority (or a preset server) may perform communication with an ECU. The certification authority may issue a certificate to the ECU or perform authentication for the certificate issued to the ECU.

Furthermore, in some implementations, the PKI may be operated as a client/server (C/S). In such scenarios, a client implements functions such as key generation and exchange, digital signature generation and verification, etc., and a server provides certificate transmission and notarization, certificate security, and authentication-related application services. Here, the client corresponds to an ECU, and the server may also correspond to at least one of a plurality of ECUs provided in the vehicle.

For example, a server may store various encryption keys, assign (or allocate) a first encryption key set to a first ECU, and assign a second encryption key set to a second ECU. In such scenarios, the first ECU decrypts a message sent to it using its first encryption key set. The second ECU cannot decrypt the message transmitted to the first ECU using the second encryption key set even if it receives the message. When the first ECU sends a message to the second ECU, the first ECU may encrypt the message using a public key and/or the first encryption key set, and the second ECU may decrypt the message using the second encryption key set.

In some implementations, among ECUs connected to a CAN, an ECU which has not been authenticated by a certification authority may be restricted from transmitting a message, or other ECUs may ignore the message transmitted by the ECU even if the message is transmitted.

In some scenarios, a sending ECU may send a message by encrypting it with a public key, while a receiving ECU which receives the message may decrypt the message with an encryption key. Alternatively, the sending ECU may encrypt the message using an encryption key, while the receiving ECU may decrypt the message using the public key.

As such, implementations of the present disclosure generally provide to a security system that encrypts data over a communication network, such as a CAN. In some implementations, the security system may help mitigate malicious technological attacks, such as hacking, of vehicles.

In some implementations, a vehicle is configured to protect and mitigate hacking of messages that are transmitted and received on a CAN through a bus. The vehicle may be configured such that its ECUs perform security-related functions by themselves, even without installing a separate security device. In some scenarios, the vehicle may be configured such that its ECUs perform security-related functions so as to mitigate disturbances of the ECUs while performing their basic functions.

In some implementations, a vehicle may be configured to improve speeds of updating an encryption key, where the encryption key is used to protect messages that are transmitted and received on a CAN through a bus.

For example, in some scenarios, the vehicle may be configured to protect ECUs from a replay attack in which a valid message is copied from a CAN and repeatedly transmitted to impersonate an authenticated user.

In some scenarios, implementations disclosed herein may have one or more effects as follows.

In some scenarios, by encrypting and decrypting messages (or CAN frames) that are transmitted and received between ECUs in a public key manner, such messages exchanged between the ECUs may be protected even if a hacker breaks a firewall. Therefore, different keys may be used for encrypting and decrypting a message, which may improve data security and lower the possibility of information leakage.

In some scenarios, encryption and decryption are not limited to being performed by a separate security device, but may be performed by ECUs themselves that are provided in a vehicle, which may result in lower costs of a security system.

In some scenarios, an assignment order of encryption keys may be determined based on a data rate, and a master ECU for assigning the encryption keys may change adaptively. Accordingly, ECUs are not interrupted in performing their own functions while performing security-related functions. Also, encryption keys may be assigned (or changed) as quickly as possible for all ECUs.

In some scenarios, a master ECU monitors the ECUs that are included in the master ECU's group, and therefore a load that is generated due to monitoring may be dispersed. Such scenarios may also protect those ECUs from a replay attack that copies valid messages and repeatedly transmits to impersonate a legitimate user.

Hereinafter, a method of assigning an encryption key to an ECU will be described in detail with reference to the accompanying drawings.

FIG. 1 is a diagram illustrating an example of a vehicle network in accordance with the present disclosure.

Referring to the example vehicle network of FIG. 1, a vehicle 100 includes one or more modems (e.g., modems 102 and 104), a plurality of ECUs (e.g., ECUs 106 through 128), and a gateway (e.g., gateway 130) connecting the modems and the plurality of ECUs.

The modems may include, for example, a mobile communication modem 102 (e.g., a Long-Term Evolution (LTE) modem) for enabling mobile communication and/or a vehicular modem 104 (e.g., a vehicle-to-everything (V2X) modem) which may enable Internet of Things (IoT) functionality.

The gateway 130 may be a device that interconnects different types of communication networks such as the modems 102, 104 and the plurality of ECUs 106 through 128, or that interconnects the same type of communication networks to allow information exchange between the communication networks. The communication networks may include a local area network (LAN), a public data network (PDN), a public switched telephone network (PSTN), a CAN, and the like. In some implementations, the gateway 130 may perform protocol conversion by interconnecting a plurality of incompatible communication networks with different protocols at each layer of an Open Systems Interconnection (OSI) reference model. For example, the gateway 130 may allow information exchange by converting a protocol between different communication networks.

The plurality of ECUs 106 through 128 may be interconnected through a bus 132 and may be connected to the gateway 130.

In some scenarios, the modems 102 and/or 104 and/or the gateway 130 may also be regarded as ECUs in that they are electronic control devices for controlling preset functions.

In some implementations, the plurality of ECUs 106 through 128 may be classified into a plurality of groups, such as groups 134 through 142, which may be referred to as Groups 1 through 5, respectively.

One or more of the groups 134 through 142 may have a master ECU managing the group. For example, group 134 (Group 1) may have the LTE modem 102 as the group master. As another example, group 136 (Group 2) may have an Ethernet Audio Video Bridging (AVB) device 144 as the group master. As another example, group 138 (Group 3) may have ECU 106 (ECU 1) as a group master. As another example, group 140 (Group 4) may have ECU 114 (ECU 5) as a group master. As another example, group 142 (Group 5) may have ECU 122 (ECU 9) as a group master.

In addition, one or more of the groups 134 through 142 may further include one or more slave ECUs that are assigned encryption keys by the master ECU. For example, group 134 (Group 1) may have the V2X modem 104 as a slave ECU. As another example, Group 136 (Group 2) may have no slave ECUs. As another example, group 138 (Group 3) may have ECU 108 (ECU 2) as a slave ECU. As another example, group 140 (Group 4) may have ECUs 110, 112, 116 (ECUs 3, 4, 6) as slave ECUs. As another example, group 142 (Group 5) may have ECUs 118, 120, 124, 126, 128 (ECUs 7, 8, 10, 11, 12) as slave ECUs.

In general, according to some implementations, if a group only includes a single ECU, then the single ECU corresponds to a master ECU of the group, and a slave ECU does not exist in that group. As another example, if a group includes multiple ECUs, then one of the multiple ECUs is a master ECU of the group, and the other ECUs are slave ECUs of that group. As such, according to some implementations of the present disclosure, one master ECU is necessarily included in a group, and the group may or may not include any additional slave ECUs.

In some scenarios, a master ECU of a group may be configured to share the same group ID with the slave ECU included in the same group. For example, all ECUs in a group may share the same group ID.

In some implementations, one of the plurality of ECUs in the vehicle 100 may operate as a master of group masters (MGM). The MGM may be configured to manage (e.g., operate as a master of) the group masters (e.g., master ECUs) that manage the different groups. As an example, the MGM may be a gateway, such as gateway 130 in the example of FIG. 1.

In some scenarios, the plurality of groups, the types of ECUs included in each group, the master ECU of each group, and the MGM may be preset by a manufacturer of a vehicle at the time of shipment, and/or may be variously modified at different times and by different entities according to different implementations.

Figure 2:
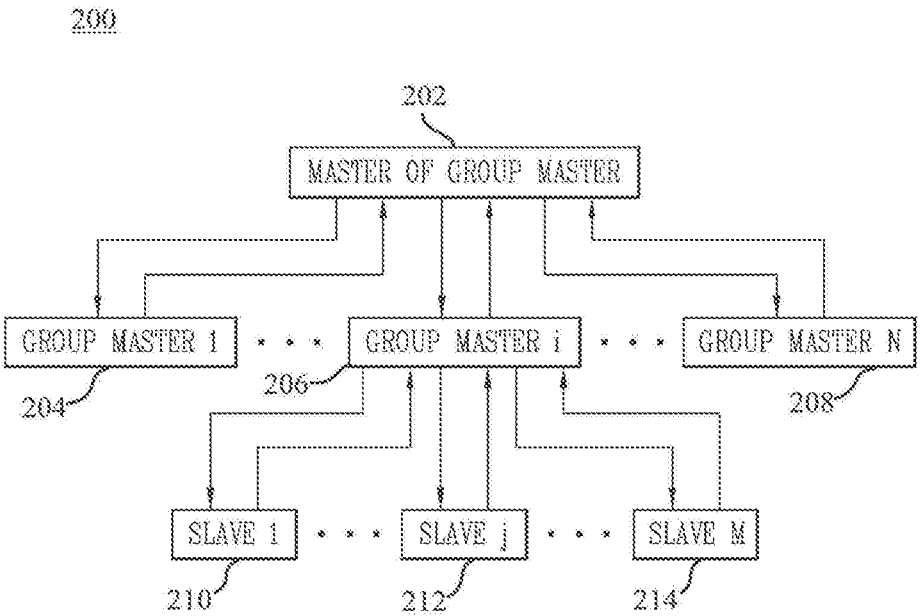
FIG. 2 is a diagram illustrating an example of a relationship among ECUs in a vehicle in accordance with one implementation of the present disclosure.

FIG. 2 is a diagram illustrating an example of a relationship 200 among ECUs in a vehicle in accordance with one implementation of the present disclosure.

FIG. 2 illustrates a case where a plurality of ECUs is grouped into a total of N groups, and an $i^{th}$ group includes M slave ECUs and one master ECU. Here, N and M are natural numbers, and i is a natural number greater than 0 and smaller than or equal to N.

In some implementations, the MGM 202 transmits an encryption key change message to at least one group master (e.g., master ECU) among the plurality of group masters that includes master ECU 204 (Group Master 1), master ECU 206 (Group Master i), and master ECU 208 Group Master N) based on a predetermined condition being satisfied.

The predetermined condition may generally relate a safety-related to security-related condition. For example, in some implementations, the predetermined condition may correspond to one or more of the following, as examples: an occurrence of a preset period, a reception of an encryption key change message from a certification authority, a detection of a hacking attempt in a firewall, a detection of an abnormal ECU that has not been authenticated during an authentication process between ECUs in a vehicle, an occurrence of a problem related to safety during traveling of a vehicle, an acceleration of a vehicle increasing higher than a reference value, a possibility of collision increasing higher than a reference value, and the like. However, the predetermined condition is not limited to the foregoing examples, and the predetermined condition(s) may vary according to different implementations.

Further, in some implementations, the MGM 202 may be configured to reset groups or to select any of ECUs included in each group as a master ECU for that group. In some implementations the particular ECU in a group that is assigned as a group master (master ECU) for the group may change, and thus the master ECU for a group may be different at different times.

The MGM 202 may be configured to collect and store information generated and managed by one or more of the master ECUs 204, 206, 208, and transmit an encryption key change message to one or more of the master ECUs 204, 206, 208 based on a predetermined condition for changing the encryption key being satisfied.

One or more of the master ECUs 204, 206, 208 that received the encryption key change message may then assign one or more encryption keys to slave ECUs. The master ECUs 204, 206, 208 may then notify the assigned encryption keys to the MGM 202.

As an example of this technique, in FIG. 2, the MGM 202 may transmit an encryption key change message to a master ECU 206 (Group Master i) of an $i^{th}$ group. The master ECU 206 of the $i^{th}$ group may transmit an acknowledgement (ACK) to the MGM 202, in response to the encryption key change message. Then, the master ECU 206 of the $i^{th}$ group may assign encryption keys to all the ECUs included in the group, such as slave ECUs 210, 212, and 214, as well as to itself. In such scenarios, for example, the encryption keys may be changed sequentially according to priorities or simultaneously. The same encryption key may be shared by ECUs in a group, or a different encryption key may be assigned to each ECU.

Continuing with this example, in transmitting an encryption key change message, the MGM 202 may also transmit a set of encryption keys (e.g., an encryption key set) that the master ECU 206 can use to generate encryption keys. The master ECU 206 may generate encryption keys using the transmitted encryption key set or selectively assign at least one of encryption keys included in the encryption key set.

A master ECU (e.g., master ECU 206 or GROUP MASTER i) of an $i^{th}$ group manages certificates for all the ECUs included in the $i^{th}$ group (e.g., slave ECU 210, 212, 214), and assigns encryption keys.

In general, a master ECU may implement a memory storing an encryption key set including a plurality of encryption keys, and may perform operations such as generating, changing, and assigning the encryption keys. In such scenarios, for example, the master ECU may assign the same encryption key to slave ECUs included in its group or assign different encryption keys for each slave ECU. A master ECU may also assign an encryption key to be used by itself.

In some implementations, a slave ECU may use an encryption key received from a master ECU as it is to encrypt or decrypt a message, or generate an encryption session key, a message authentication key, and a key update key by using the encryption key.

A slave ECU may encrypt at least one of fields included in a CAN frame using an encryption key, generate a message authentication code, and then transmit the message authentication code to another ECU via a bus.

The MGM 202 may be authenticated by a certification authority, a master ECU (e.g., master ECU 206) may be authenticated by the MGM, and a slave ECU (e.g., slave ECU 210, 212, or 214) may be authenticated by a master ECU (e.g., master ECU 206) included in its group. Since the authentication is distributed, all the ECUs do not necessarily have to be authenticated by the certification authority, which may result in an increase in efficiency.

An order in which a master ECU (e.g., master ECU 204, 206, or 208) assigns encryption keys may differ from group to group, and differ even in the same group depending on ECUs. For example, after encryption keys for a group A are assigned, encryption keys for a group B may be assigned. When a master ECU of the group B assigns encryption keys, the master ECU of the group B may first assign an encryption key to a first slave ECU and assign an encryption key to a second slave ECU. In some implementations, the assignment of the encryption keys may be sequentially performed in a predetermined order. For example, this may be appropriate in scenarios where one message is transmitted to a bus, and transmissions of other messages are held due to arbitration in view of the nature of the CAN.

Maintaining the security of messages that are transmitted and received on the CAN may rely upon how often an encryption key or decryption key of each ECU is changed. In some scenarios, higher security is maintained when a key is changed more often. Therefore, ECUs are classified into an MGM (e.g., MGM 202), a master ECU (e.g., master ECUs 204, 206, 208), and slave ECUs (e.g., slave ECUs 210, 212, 214), and keys are changed according to a preset method for each group, so that such keys can be often changed while satisfying fairness between ECUs in consideration of specificity of the ECUs.

For example, an ECU that needs to have a high response speed may form a group by itself. This makes it possible to change encryption keys in a short period of time and to minimize interference with existing functions due to the change in the encryption keys, especially in scenarios where it may take a longer time to wait for being assigned encryption keys when more ECUs are included in a group.

As another example, a plurality of ECUs whose response speed is slower than a reference speed may form a separate group, and may be allocated a time slot of the CAN at an appropriate time according to judgment of the MGM 202. In such scenarios, a different priority may be set for each ECU according to a communication state of the CAN, and functions to be basically processed by the ECUs may not be disturbed by a change/assignment of encryption keys.

Figure 3:
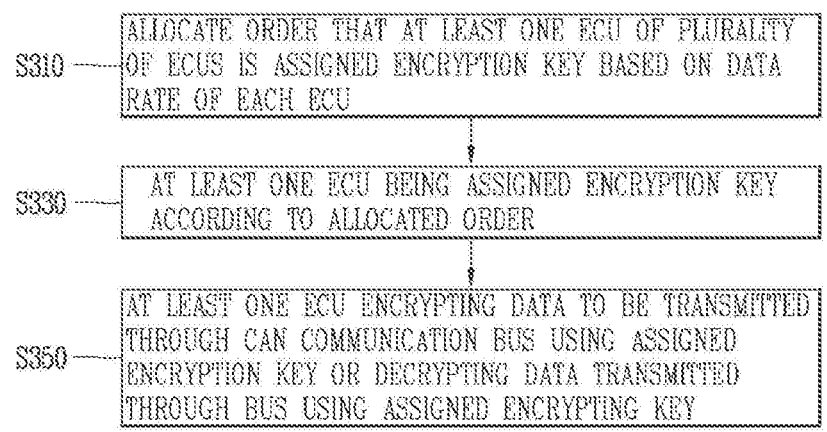
FIG. 3 is a flowchart illustrating an example of a vehicle control method in accordance with the present disclosure.

FIG. 3 is a flowchart illustrating an example of a vehicle control method in accordance with the present disclosure.

In some implementations, an order in which at least one of a plurality of ECUs is assigned an encryption key may be allocated based on a data rate of each ECU (S310). The data rate of an ECU generally refers to an amount of data that is transmitted by the ECU over a period of time.

Just as one example, in some implementations, a data rate of an ECU refers to a value obtained by dividing (i) an amount of data to be probabilistically transmitted from the ECU over a time period by (ii) an average value of the amount of data.

For example, an amount of data $R_{ij}$ to be probabilistically transmitted by a j-th ECU of an i-th group over a time period t may be defined by Equation 1.

$$R_{ij}(t) = r_{ij}(t) * e^{-r_{ij}(t)*t} \quad (1)$$

Here, $r_{ij}(t)$ denotes an amount of data that the j-th ECU of the i-th group is transmitting over the time period t.

Then, the data rate of the ECU may be defined by Equation 2.

$$\delta_{ij}(t) = \frac{R_{ij}(t)}{R_{ij}^{average}(t)} \quad (2)$$

Here, $R_{ij}^{average}(t)$ denotes an average value of the amount of data to be probabilistically transmitted by the j-th ECU of the i-th group over the time period t.

In some implementations, at least one ECU with the highest data rate among all ECUs may be allocated the highest priority.

If there are at least two ECUs having the same data rate, then in some implementations, the higher (assignment) order may be allocated to one having higher priority of ID. Alternatively, the higher order may be allocated to one having a low maximum delay requirement which is set for each ECU. For example, if a first ECU has a maximum delay requirement time of 10 msec and a second ECU has a maximum delay requirement time of 20 msec, then the assignment order allocated to the first ECU may be higher than that allocated to the second ECU, according to some implementations.

In some scenarios, the order in which the encryption keys are assigned may be determined by an MGM and/or a master ECU.

Referring again to FIG. 3, the at least one ECU to which such order has been allocated may be assigned an encryption key according to the allocated order (S330).

In some implementations, an MGM assigns encryption keys to a master ECU, and the master ECU assigns the encryption keys to slave ECUs included in its group.

The MGM may randomly extract (e.g., according to a particular probability distribution, such as a normal distribution) arbitrary keys (or short-term keys) from its own long-term key, and assign the keys to each master ECU, according to some implementations.

For example, a plurality of ECUs may be classified into a plurality of groups, and a master ECU may be selected for each group. Any one of the plurality of groups may include one master ECU and one or more slave ECUs. In one group, encryption keys may be assigned by a master ECU included in the group.

A master ECU that has received an encryption key change message from an MGM may assign encryption keys to slave ECUs included in the same group, for example sequentially according to an allocated order or simultaneously.

Referring again to FIG. 3, the at least one ECU assigned with the encryption key may encrypt data to be transmitted through a CAN bus using the encryption key assigned thereto, or decrypt data transmitted through the bus using the encryption key assigned thereto (S350).

Regarding the encryption key assignment, each ECU may implement a memory for storing a set of encryption keys (or encryption key set). For example, the memory may be disposed on a circuit board of an ECU and may be located in a physically separated region to which unauthorized software is inaccessible on the circuit board. In some implementations, the memory may be referred to as a hardware key storage in the sense that it is separated in hardware configuration.

In some scenarios, an encryption key to be used for encryption or decryption is stored in a memory that is disposed in a physically separated region on a circuit board. When an ECU encrypts or decrypts an original message, the ECU may acquire an encryption or decryption message by inputting the original message in its memory. For example, when an encrypted message is received, an ECU may acquire a decryption message by inputting the received message into a memory. As another example, if there is a message to be transmitted, an ECU may acquire an encryption message by inputting the message to be transmitted into a memory.

In scenarios where encryption keys for encryption and/or decryption are stored in a memory which is physically separated to be inaccessible by unauthorized software and encryption and/or decryption is performed in the memory, security may be enhanced as compared with an encryption and/or decryption techniques that utilize a software library.

An ECU may encrypt data to transmit or decrypt transmitted thereto using such assigned encryption key, and an order that an encryption key is assigned may differ depending on a data rate of the ECU. Thus, an encryption key may be changed quickly and frequently while assigning the encryption key to satisfy fairness in consideration of characteristics of the ECU.

Further, in scenarios where communication between ECUs is encrypted and decrypted by a public key encryption algorithm, even if a packet generated by a hacker breaks a firewall of a vehicle, it would not negatively affect the ECUs. As such, this may result in further enhancing security of the vehicle.

Figure 4:
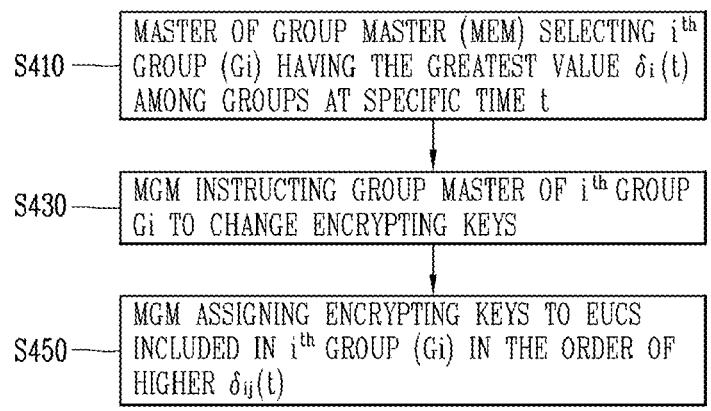
FIG. 4 is a flowchart illustrating an example of the control method of FIG. 3 in more detail.
Figure 5:
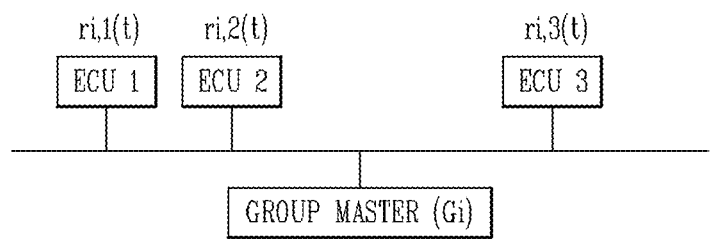
FIG. 5 is a diagram illustrating an example of selecting a group of ECUs based on a data rate.

FIG. 4 is a flowchart illustrating an example of the control method of FIG. 3 in more detail, and FIG. 5 is a diagram illustrating an example of selecting a group of ECUs based on a data rate.

Based on a predetermined condition being satisfied, an MGM selects a group, among multiple groups, which has the greatest sum of data rates (data rate sum) over a time period t (S410). In this example, the selected group is referred to as $i^{th}$ group, or group Gi.

The sum of data rates is defined as a value obtained by adding the data rates of ECUs included in each group. For example, as illustrated in FIG. 5, the $i^{th}$ group Gi may include ECU 1, ECU 2, and ECU 3, and a data rate sum Ri of the $i^{th}$ group Gi is the sum of a data rate $r_{i,1}(t)$ of the ECU 1, a data rate $r_{i,2}(t)$ of the ECU 2, and a data rate $r_{i,3}(t)$ of the ECU 3.

The MGM, in some implementations, grants an encryption key assignment opportunity in an order of a greater data rate sum.

However, in some scenarios, such as in exceptional cases, when a traffic load of the CAN is larger than a reference value, the encryption key assignment opportunity may alternatively be granted in an order of a smaller data rate sum. Scenarios where the traffic load is larger than the reference value may indicate that there is much data to be sent by ECUs, and it is to prevent a traffic increase due to an encryption key assignment under a situation of a large traffic load. As an example, the traffic load may be defined as a sum of data rates of all ECUs.

Referring again to FIG. 4, the MGM instructs a master ECU (or group master) of the selected group Gi to change encryption keys (S430). For example, the MGM transmits an encryption key change message to the master ECU of the $i^{th}$ group Gi via the CAN bus.

The master ECU of the $i^{th}$ group Gi (e.g., Group Master (Gi) in FIG. 5) sequentially assigns respective encryption keys to ECUs included in the $i^{th}$ group in the order of a higher data rate (S450). The master ECU may allocate the order of assigning the encryption keys to itself and/or slave ECUs based on data rates, and assign the encryption keys according to the allocated order.

As a specific example, the MGM may perform a first step of selecting an $i^{th}$ group among N groups based on the sum of data rates of ECUs included in each group. In this example, N is a natural number and denotes a total number of groups for classifying ECUs provided in a vehicle, where 0<i≤N.

A master ECU of the $i^{th}$ group Gi (e.g., Group Master (Gi) in FIG. 5) selects a $j^{th}$ ECU from M ECUs included in the $i^{th}$ group Gi based on a data rate of each ECU, and performs a second step of assigning an encryption key to the selected $j^{th}$ ECU. Here, M and j are natural numbers, and 0<j≤M.

The master ECU of the $i^{th}$ group Gi repeats the second step until all the ECUs included in its group are assigned the encryption keys. For example, in case where the number M of ECUs in the $i^{th}$ group is equal to 2, a second ECU is first assigned an encryption key and then the remaining first ECU is assigned an encryption key.

After all the ECUs included in the $i^{th}$ group Gi are assigned the encryption keys, the MGM repeats the first step in a state of excluding the $i^{th}$ group Gi. At least one of the first and second steps is repeated until all the ECUs are assigned the encryption keys.

Hereinafter, a method of assigning encryption keys to slave ECUs by a master ECU of an $i^{th}$ group Gi will be described in more detail with reference to FIGS. 6 to 8.

Figure 6:
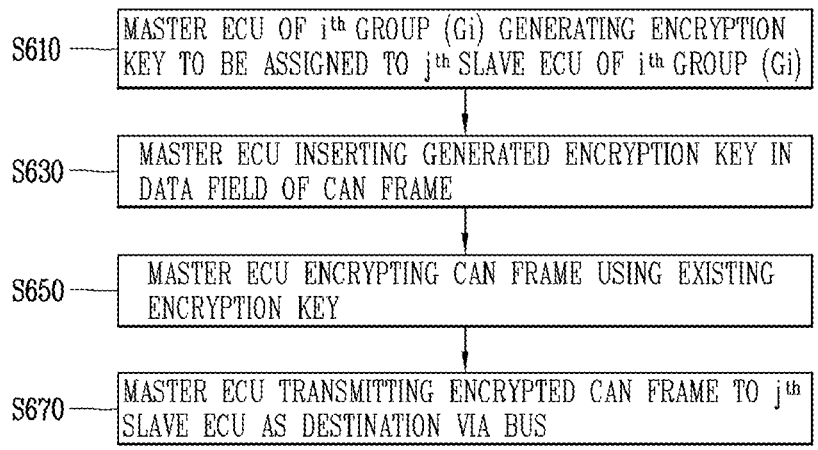
FIG. 6 is a flowchart illustrating an example of a method of assigning an encryption key.
Figure 7:
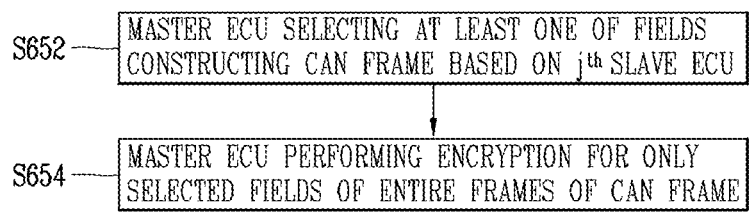
FIG. 7 is a flowchart illustrating an example of a method for performing encryption when assigning an encryption key.

FIG. 6 is a flowchart illustrating an example of a method of assigning an encryption key, and FIG. 7 is a flowchart illustrating an example of a method of performing encryption when assigning an encryption key. FIG. 8 is a diagram illustrating an example of fields included in a CAN frame.

Referring to FIG. 6, when assigning an encryption key to a j-th ECU, a master ECU of an i-th group generates an encryption key to be assigned to the j-th ECU (610).

Since each ECU has a memory for storing an encryption key set on a circuit board, the master ECU may generate at least one encryption key using the encryption key set stored in the memory. The master ECU may select at least one encryption key from the encryption key set, or may generate a new encryption key by combining at least one encryption key included in the encryption key set.

In such scenarios, ECUs included in the same group may share the same encryption key. Specifically, the master ECU may assign the same encryption key to slave ECUs having the same group ID.

In some implementations, if it is determined that a high level of system security is appropriate due to detection of a high-risk hacking attempt, an MGM may instruct an individual key manner, other than a group key manner, to a master ECU. In this case, the master ECU may assign different encryption keys to slave ECUs included in the same group.

The MGM may select whether to assign encryption keys in a group key manner or an individual key manner according to a predetermined condition, and instruct the selected manner to the master ECU. The master ECU assigns the encryption keys according to the instruction.

Next, the master ECU inserts the generated encryption key into a data field of a CAN frame (S630), and encrypts the CAN frame using an existing encryption key (S650).

The generated encryption key is included in the CAN frame and transmitted from the master ECU to a slave ECU via a bus. The generated encryption key is inserted into a data field of the CAN frame and transmitted through a bus.

Figure 8:
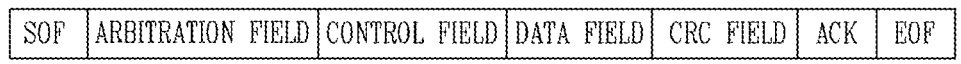
FIG. 8 is a diagram illustrating an example of fields included in a CAN frame.

As illustrated in the example of FIG. 8, a CAN frame may be provided with SOF, ARBITRATION FIELD, CONTROL FIELD, DATA FIELD, CRC FIELD, ACK, and EOF.

The SOF, or start of field, defines the beginning of the CAN frame, and EOF, or end of field, defines the end of the CAN frame.

ARBITRATION FIELD identifies a message and sets priority of the message.

DATA FIELD contains data. The encryption key is inserted into the DATA FIELD and transmitted.

CRC FIELD may be related to a cyclic redundancy check (CRC) operation, and consists of 15 bits of periodic redundancy check code and backward delimiter bits and is used for error detection.

A slave ECU that has correctly received a message may acknowledge the message reception, for example using an ACK bit. In order for a receiver to respond with an ACK after a transmitter transmits a CAN frame, dominant bits (6 bits) and 8 bits immediately following the dominant bits within the ACK should be all received.

An encryption key is transmitted using the CAN frame, but may be likely to be exposed to a third party during the transmission. To prevent this problem in advance, the master ECU encrypts the CAN frame in which the encryption key has been inserted.

Since a new encryption key is assigned to a slave ECU to which a public key and an encryption key have already been assigned, a master ECU may encrypt a CAN frame, in which the new encryption key is included, using the existing encryption key or using the public key, such that the slave ECU can perform decryption.

Referring again to FIG. 6, the encrypted CAN frame is transmitted to the $j^{th}$ ECU as a destination via the CAN bus (S670). The $j^{th}$ ECU may receive the transmitted CAN frame, acquire the new encryption key using its existing encryption key, and change the existing encryption key to the new encryption key.

Referring to FIG. 7, in some implementations when the CAN frame is encrypted using the existing encryption key, the master ECU may select at least one field among the fields constituting the CAN frame based on an ECU to which an encryption key is to be assigned (S652).

In some scenarios, if all the fields of the CAN frame are encrypted, then it may take a long time to encrypt the CAN frame on a sending side of the CAN frame and it may take a long time to decrypt the CAN frame on a receiving side.

However, if only some fields of the CAN frame are encrypted, then information contained in unencrypted fields may be used for hacking. For example, if ARBITRATION ID is exposed unencrypted, then a Replay Attack may be made that copies the same frame and generates a CAN frame with a higher priority to transmit it repeatedly.

To address such difficulties, in some implementations a maximum allowable delay time is set in each ECU. A master ECU may compare (i) a time required when encryption is applied to a CAN frame with (ii) a maximum allowable delay time of a slave ECU. Based on the comparison result, the master ECU may select at least one field among entire fields of the CAN frame.

For example, if the required time is shorter than the maximum allowable delay time, then all fields of the CAN frame are encrypted.

In some implementations, if the required time is longer than the maximum allowable delay time, then at least one field is selected such that the required time can become shorter than the maximum allowable delay time. For example, a field to be selected may differ depending on a maximum allowable delay time set in a slave ECU, and consequently may differ depending on the slave ECU.

In some implementations, a type of field to be selected may vary according to a predetermined condition. For example, if hacking is detected in a state with high probability of collision, then it may be appropriate to change an encryption key quickly. In this case, a time duration for assignment of an encryption key may be reduced by encrypting only the DATA FIELD.

As another example, an MGM may instruct an encryption key assignment, for example in response to detection of a Replay Attack. In this case, if such an attack is made targeting a specific ID, then the ARBITRATION FIELD and the DATA FIELD in the CAN frame may be encrypted. If a modified Replay Attack that continuously transmits an ACK in a repeated manner is detected, then a slave ECU may encrypt the ACK of the CAN frame.

Referring again to FIG. 7, the master ECU may perform encryption only for the selected field among the entire fields of the CAN frame (S654).

In some implementations, a plurality of ECUs provided in a vehicle may be classified into a plurality of groups, and this classification may be preset by a manufacturer at a factory. Further, the classification may be reclassified by an MGM.

Figure 9:
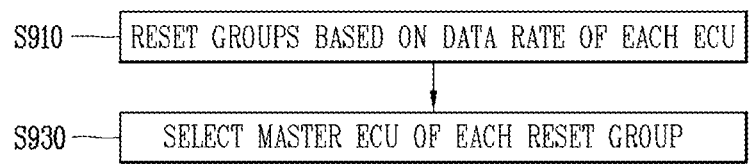
FIG. 9 is a flowchart illustrating an example of resetting ECUs provided in a vehicle to new groups.

FIG. 9 is a flowchart illustrating an example of a method of resetting ECUs provided in a vehicle to new groups.

In some implementations, if a preset condition is satisfied, then an MGM may reset preset groups based on a data rate of each ECU (S910).

For example, in the case of assigning encryption keys, since such assignment is made for each group, a time point at which each ECU is assigned an encryption key may differ depending on how groups are set. A data rate of each ECU varies depending on a time point and a situation. Accordingly, if groups are fixed, then it may be difficult to be flexibly cope with a data rate change. Accordingly, in some implementations, when a preset condition is satisfied, the MGM may reclassify ECUs into new groups based on a data rate of each ECU.

The preset condition may be variously set according to different implementations, and examples of the preset condition may include a preset period having elapsed, a hacking being detected, or a start-up being turned on.

In some implementations, an MGM may calculate the sum of data rates for all combinations in which groups can be set, and search for a combination in which the sum of data rates of each group is the greatest while satisfying a maximum delay requirement time set for each ECU. A primary ECU, such as an engine in which a response time is important, may have a short maximum delay requirement time, and thus may be individually classified into a single group.

Referring again to FIG. 9, the MGM may select a master ECU for each reset group (S930).

In some implementations, the MGM may change a master ECU included in at least one group while maintaining groups. For example, a master ECU in at least one group may differ depending on a time point at which an encryption key is assigned.

The master ECU may typically perform not only its own ECU functions but also additional functions of generation/distribution/management of encryption keys. Therefore, if an ECU, such as an engine or a brake, which typically replies in real time, additionally performs functions of the master ECU, then an assignment of encryption keys may be delayed or malfunctioned.

Therefore, according to some implementations, when a preset condition is satisfied, the MGM may select an ECU having the lowest data rate as a master ECU, among ECUs included in each group. In such scenarios, for example, a CPU performance and data rate of each ECU may be considered in a comprehensive manner.

Figure 10:
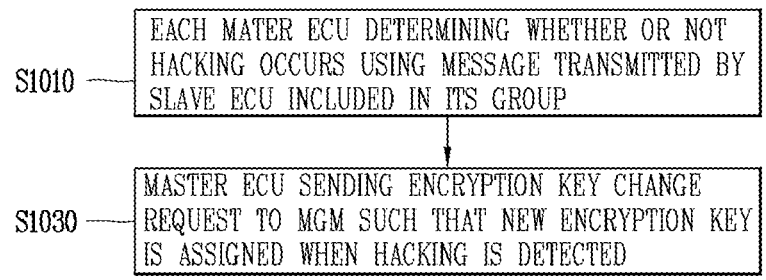
FIG. 10 is a flowchart illustrating an example of a method in which a master ECU monitors slave ECUs in one group.

FIG. 10 is a flowchart illustrating an example of a method in which a master ECU monitors slave ECUs in one group.

In some implementations, each master ECU determines whether or not hacking is detected by using a message transmitted from a slave ECU included in its own group through a bus (S1010).

As a specific example, it may be determined that hacking has occurred when messages transmitted by a slave ECU for a unit time through the bus are counted and a total number of messages transmitted for the unit time exceeds a predetermined number which has been set for the one slave ECU.

The master ECU checks a transmitter ID in a CAN frame that travels on the bus. If it is an ECU included in its own group, the master ECU checks how many CAN frames are transmitted per unit time. The master ECU has an allowable transmission number for each ECU included in its group in a form of a table, and may monitor each ECU included in its group using the table.

If it is determined that there is hacking, then the master ECU requests an encryption key change from the MGM so that a new encryption key is assigned (S1030).

If more CAN frames than the allowed number are transmitted, a corresponding ECU is in abnormal operation. Accordingly, the master ECU transmits an encryption key change request to the MGM and also transmits information related to the ECU which is in the abnormal state.

Since each master ECU monitors ECUs included in its own group, a load caused due to monitoring is dispersed.

Figure 11:
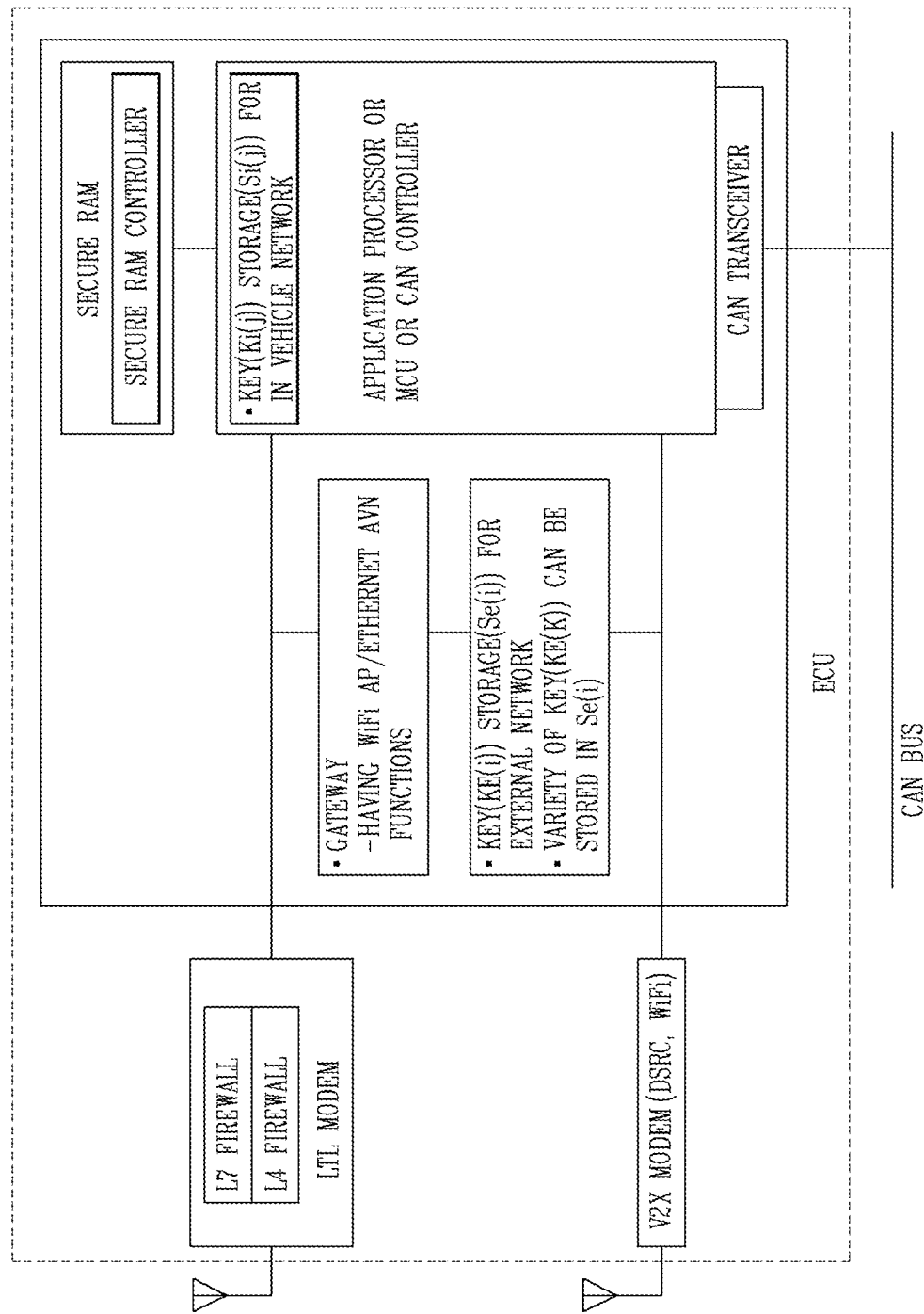
FIG. 11 is a diagram illustrating an example of ECUs in accordance with one implementation of the present disclosure.

FIG. 11 is a diagram illustrating an example of ECUs in accordance with one implementation of the present disclosure.

Each ECU is connected via a CAN bus and has a physically separated memory (SECURE RAM). In addition, each ECU may be provided with a modem and a gateway. For more enhanced security, an L3/L4 firewall and/or an L7 firewall may be provided.

Hereinafter, operations of a vehicle according to the present disclosure will be sequentially described again. An MGM determines whether a predetermined condition is satisfied.

The predetermined condition may be, for example, when a predetermined period has come, or when a preset event has occurred. For example, it may be determined that the predetermined condition has been satisfied when a start-up of the vehicle is turned on and an ECU is powered on.

The MGM performs authentication from a certification authority using various communication devices.

When the authentication is completed, the MGM classifies/reclassifies a plurality of ECUs provided in the vehicle into a plurality of groups, so as to secure a maximum delay requirement time set for each ECU based on a specific time point. Specifically, classification/reclassification of groups is performed so that operations of "request/reception/response/encryption key change" for changing an encryption key are performed by a master ECU and a target ECU within a maximum delay requirement time of the target ECU.

The MGM may also schedule a manner of distributing encryption keys (simultaneous/sequential, same encryption key/different encryption keys) and/or an encryption key assignment period of each group.

Subsequently, the MGM randomly extracts (e.g., according to a particular probability distribution, such as a normal distribution) arbitrary keys (or short-term keys) from its long-term key and assigns such keys to each master ECU. In such scenarios, for example, an order of assignment may be changed according to the sum of data rates of each group.

Each group master may assign encryption keys to slave ECUs belonging to its group and to itself using the short-term keys. In such scenarios, for example, the order of assignment may be changed according to a data rate of each slave ECU.

The present disclosure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), read only memory (ROM), random access memory (RAM), CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described implementations are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

The invention claimed is:

1. A method of controlling a vehicle that comprises a plurality of electronic control units (ECUs), the method comprising:

allocating an order in which at least one ECU among the plurality of ECUs is to be assigned an encryption key, based on a data rate of each ECU;

receiving, by the at least one ECU, at least one encryption key that is assigned to the at least one ECU according to the allocated order;

performing, by the at least one ECU and using the assigned at least one encryption key, (i) encryption of data to be transmitted through a Controller Area Network (CAN) communication bus, or (ii) decryption of data that is transmitted through the CAN communication bus, classifying the plurality of ECUs into a plurality of groups; and selecting a master ECU for each group, wherein, for a group among the plurality of groups, the group comprises one master ECU and one or more slave ECUs, and wherein the master ECU included in the group is configured to assign the encryption key.

2. The method of claim 1, wherein at a first instance of time, the master ECU in the group is a first ECU in the group, and wherein at a second instance of time, the master ECU in the group is a second ECU in the group, different from the first ECU.

3. The method of claim 2, wherein the master ECU of the group has a lowest data rate among all ECUs included in the group.

4. The method of claim 1, wherein the master ECU of the group sequentially assigns the encryption key to each of the one or more slave ECUs in the group, according to the allocated order.

5. The method of claim 4, further comprising:

a selection operation of selecting an i-th group among N groups, based on a corresponding sum of data rates of ECUs included in each of the N groups; and an assignment operation of assigning the at least one encryption key to a j-th ECU in the selected i-th group, based on a data rate of each of M ECUs in the selected i-th group, wherein at least one of the selection operation or the assignment operation is repeated until all ECUs are assigned a corresponding encryption key, and wherein N, M, i, and j are natural numbers, with $0<i\leq N$, and $0<j\leq M$.

6. The method of claim 5, wherein the master ECU of the i-th group performs, in assigning the encryption key to the j-th ECU of the i-th group:

inserting, into a data field of a CAN frame, an encryption key to be assigned to the j-th ECU;

encrypting the CAN frame using an existing encryption key set that is assigned to the j-th ECU; and transmitting, through the CAN communication bus, the encrypted CAN frame to the j-th ECU as a destination.

7. The method of claim 6, wherein the master ECU of the i-th group, in encrypting the CAN frame, selects at least one field among fields constituting the CAN frame based on the j-th ECU, and performs encryption only for the selected at least one field, and wherein the at least one field that is encrypted in the CAN frame depends on a type of the j-th ECU.

8. The method of claim 6, wherein the master ECU of the i-th group comprises a memory configured to store an encryption key set, wherein the master ECU of the i-th group further performs generating the encryption key using the encryption key set, in assigning the encryption key to the j-th ECU, and wherein the generated encryption key is inserted into the data field of the CAN frame.

9. The method of claim 8, wherein the memory is disposed in a circuit board provided in the master ECU of the i-th group, and is disposed in a physically separated region that is inaccessible by unauthorized software on the circuit board.

10. The method of claim 1, wherein the master ECU of the group performs:
   determining whether hacking has occurred based on at least one message that is transmitted through the CAN communication bus from the one or more slave ECUs in the group; and
   based on a determination that the hacking has occurred, requesting an encryption key change for assigning new encryption keys.

11. The method of claim 10, wherein determining whether hacking has occurred comprises:
   counting a number of messages that are transmitted over a period of time through the CAN communication bus by the one or more slave ECUs; and
   determining that the hacking has occurred based on a total number of messages that are transmitted over the period of time exceeding a threshold number that is set for the one or more slave ECUs.

12. The method of claim 1, wherein all ECUs in the group share a same group ID, and
   wherein the master ECU of the group assigns a same encryption key to the one or more slave ECUs having the same group ID.

13. The method of claim 1, wherein the master ECU of the group assigns different encryption keys to the one or more slave ECUs in the group.

14. The method of claim 1, further comprising:
   based on a second condition being satisfied, reclassifying the plurality of ECUs into new groups based on a data rate of each of the plurality of ECUs.

15. A vehicle comprising a plurality of electronic control units (ECUs), the vehicle comprising:
   a plurality of slave ECUs each configured to, using an encryption key assigned thereto, (i) encrypt data to be transmitted through a CAN communication bus, or (ii) decrypt data that is transmitted through the CAN communication bus;
   a master ECU configured to:
      allocate an order in which at least one slave ECU among the plurality of slave ECUs is to be assigned an encryption key, based on a data rate of each of the at least one slave ECU, and
      sequentially assign at least one encryption key to the at least one slave ECU according to the allocated order; and
   a master-of-master-ECUs configured to transmit an encryption key assignment command to the master ECU for the master ECU to assign encryption keys to the plurality of slave ECUs, based on a predetermined condition being satisfied,
   wherein the plurality of ECUs is grouped into a plurality of groups,
   wherein the master ECU is one of a plurality of master ECUs that are respectively selected for the plurality of groups,
   wherein a group among the plurality of groups comprises the master ECU and at least one slave ECU, and
   wherein the master ECU in the group is configured to assign the encryption key.

16. The vehicle of claim 15, wherein the master ECU of the group is an ECU having a lowest data rate, from among all ECUs included in the group,
   wherein at a first instance of time, the master ECU in the group is a first ECU in the group, and
   wherein at a second instance of time, the master ECU in the group is a second ECU in the group, different from the first ECU.

17. The vehicle of claim 15, wherein the master ECU of the group is further configured to:
   determine whether hacking has occurred for the at least one slave ECU in the group, and
   based on a determination that the hacking has occurred, transmit an encryption key change request to the master-of-master-ECU for assigning new encryption keys to the at least one slave ECU.

18. The vehicle of claim 15, wherein the master-of-master-ECU is further configured to:
   reclassify the plurality of ECUs into new groups based on a data rate of each of the plurality of ECUs, based on a second condition being satisfied.

19. A vehicle comprising a plurality of electronic control units (ECUs), the vehicle comprising:
   a plurality of slave ECUs each configured to, using an encryption key assigned thereto, (i) encrypt data to be transmitted through a CAN communication bus, or (ii) decrypt data that is transmitted through the CAN communication bus;
   a master ECU configured to:
      allocate an order in which at least one slave ECU among the plurality of slave ECUs is to be assigned an encryption key, based on a data rate of each of the at least one slave ECU, and
      sequentially assign at least one encryption key to the at least one slave ECU according to the allocated order; and
   a master-of-master-ECUs configured to transmit an encryption key assignment command to the master ECU for the master ECU to assign encryption keys to the plurality of slave ECUs, based on a predetermined condition being satisfied,
   wherein the master-of-master-ECU is further configured to:
      reclassify the plurality of ECUs into new groups based on a data rate of each of the plurality of ECUs, based on a second condition being satisfied.

* * * * *